3,321,484
PYRIDINECARBOXYLIC ACID ESTERS OF CYCLOBUTANEDIOLS
Carl Peter Krimmel, Wauconda, Ill., assignor to G. D. Searle & Co., Chicago, Ill., a corporation of Delaware
No Drawing. Filed June 21, 1965, Ser. No. 465,704
5 Claims. (Cl. 260—295.5)

The present invention relates to a group of esters of cyclobutanediols. More particularly, it relates to compounds having the following general formula:

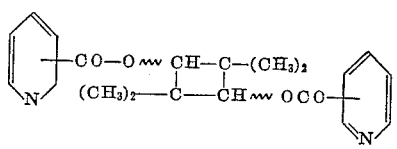

The acid portion of these esters is derived from a pyridinecarboxylic acid; it can be picolinic, nicotinic, or isonicotinic acid. The ester substituents on the cyclobutane nucleus can have either a cis or trans relationship with regard to each other. In structural formulas, the cis or trans configuration is shown by the use of solid or dashed lines for the cyclobutane substituents. Thus, any substituents attached to a cyclobutane by the same kind of line are on the same side of the ring. A wavy line ( ∼ ) indicates either cis or trans attachment for the substituents involved.

Also encompassed by this invention are the nontoxic salts of the aforementioned organic bases, as exemplified by the hydrochloride, hydrobromide, hydroiodide, tartrate, succinate, maleate, acetate, citrate, ascorbate, nitrate, sulfate, phosphate, and sulfamate.

The compounds of the present invention are prepared by reacting the appropriate cyclobutanediol with a pyridinecarboxylic acid halide. The acid chloride is preferred for this reaction. The reaction can be carried out in the presence of a tertiary amine which reacts with the hydrogen chloride formed in the reaction. Pyridine is useful for this purpose and an excess of this amine can be used as the solvent for the reaction.

The present compounds are useful because of their pharmacological properties. In particular, they possess anti-atherogenic activity. Thus, they have been found to reduce serum triglycerides; they have also been found to bring about a reduction in the serum chylomicron count. The compounds have also shown activity as anti-ulcer agents, pepsin inhibitors, anti-fungal agents against *Trichophyton mentagrophytes*, and inhibitors of the germination of seeds of Trifolium.

The following examples are presented to further illustrate the present invention; they should not be construed as limiting it in spirit or in scope. In these examples, quantities by weight are indicated in grams, quantities by volume are indicated in milliliters, and temperatures are indicated in degrees centigrade (° C.).

Example 1

A mixture of 24.6 grams of nicotinic acid and 80 ml. of thionyl chloride is refluxed on a steam bath for 2 hours. Unreacted thionyl chloride is removed from the mixture by vacuum distillation on a steam bath. Azeotropically dried benzene is added to the mixture and distillation is resumed to remove the final traces of thionyl chloride with the benzene.

The residual nicotinoyl chloride hydrochloride is then suspended in 50 ml. of anhydrous pyridine. A solution of 14.4 grams of 2,2,4,4-tetramethyl-cis-1,3-cyclobutanediol in 50 ml. of anhydrous pyridine is added to the acid chloride solution and the resultant mixture is refluxed for 1.5 hours. The pyridine solvent is then removed from the mixture by vacuum distillation and the resultant semi-crystalline residue is cooled, mixed with 300 ml. of cold water, and filtered. The separated solid is again suspended in 100 ml. of cold water and then filtered and air dried. The crude product is then dissolved in 300 ml. of acetone at room temperature and the solution is treated with activated carbon. The acetone solution is diluted by the slow addition of 400 ml. of water. During the course of the dilution, a seed crystal is added; a white crystalline precipitate is present when the dilution is complete. The solid thus obtained is separated by filtration, washed with water and dried in a steam cabinet to give a crystalline solid melting at about 93–96° C. The product thus obtained is 2,2,4,4-tetramethyl-cis-1,3-cyclobutylene dinicotinoate and it has the following formula:

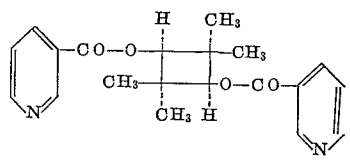

Example 2

14.4 grams of 2,2,4,4-tetramethyl-trans-1,3-cyclobutanediol is substituted for the cis-diol and the procedure of Example 1 is repeated. In this case, the crude product is recrystallized from 400 ml. of refluxing 2-propanol to give white crystals melting at about 150–153° C. The product thus obtained is 2,2,4,4-tetramethyl-trans-1,3-cyclobutylene dinicotinoate and it has the following formula:

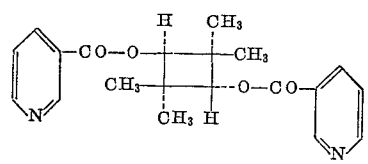

Example 3

14.4 grams of 2,2,4,4-tetramethyl-cis-1,3-cyclobutanediol is reacted with the acid chloride obtained from 24.6 grams of isonicotinic acid according to the procedure described in Example 1. The crude product is recrystallized from 150 ml. of refluxing 2-propanol to give 2,2,4,4 - tetramethyl-cis-1,3-cyclobutylene diisonicotinoate melting at about 140–142° C. This compound has the following formula:

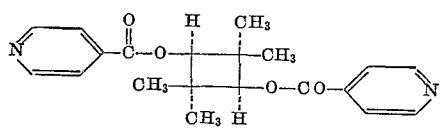

Example 4

The reaction of 14.4 grams of 2,2,4,4-tetramethyl-trans-1,3-cyclobutanediol with the acid chloride from 24.6 grams of isonicotinic acid, according to the procedure of Example 1, gives white leaflets of 2,2,4,4-tetramethyl-trans-1,3-cyclobutylene diisonicotinoate melting at about 172–175° C. In this case, the crude ester is purified by recrystallization from refluxing 2-propanol.

What is claimed is:
1. A compound of the formula

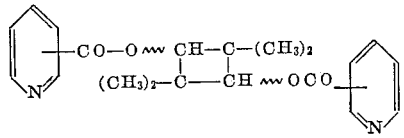

2. 2,2,4,4-tetramethyl-cis-1,3-cyclobutylene dinicotinoate.
3. 2,2,4,4-tetramethyl-trans - 1,3 - cyclobutylene dinicotinoate.
4. 2,2,4,4 - tetramethyl-cis-1,3-cyclobutylene diisonicotinoate.
5. 2,2,4,4-tetramethyl-trans-1,3-cyclobutylene diisonicotinoate.

No references cited.

WALTER A. MODANCE, *Primary Examiner.*
ALAN L. ROTMAN, *Assistant Examiner.*